(12) United States Patent
Park et al.

(10) Patent No.: US 9,147,050 B2
(45) Date of Patent: Sep. 29, 2015

(54) SYSTEM AND METHOD FOR CLIPBOARD SECURITY

(75) Inventors: Chel Park, Seoul (KR); Hyungsuk Kim, Seoul (KR)

(73) Assignee: FASOO.COM CO. LTD., Seoul (KR)

( * ) Notice: Subject to any disclaimer, the term of this patent is extended or adjusted under 35 U.S.C. 154(b) by 272 days.

(21) Appl. No.: 13/147,287

(22) PCT Filed: Feb. 2, 2010

(86) PCT No.: PCT/KR2010/000621
§ 371 (c)(1),
(2), (4) Date: Aug. 1, 2011

(87) PCT Pub. No.: WO2010/087678
PCT Pub. Date: Aug. 5, 2010

(65) Prior Publication Data
US 2012/0226913 A1    Sep. 6, 2012

(30) Foreign Application Priority Data

Feb. 2, 2009    (KR) ........................ 10-2009-0007885

(51) Int. Cl.
*G06F 21/00*    (2013.01)
*G06F 21/10*    (2013.01)
(Continued)

(52) U.S. Cl.
CPC .............. *G06F 21/10* (2013.01); *G06F 21/556* (2013.01); *G06F 21/6209* (2013.01); *G06F 2221/2107* (2013.01); *G06F 2221/2113* (2013.01);
(Continued)

(58) Field of Classification Search
USPC ........................................................ 713/189
See application file for complete search history.

(56) References Cited

U.S. PATENT DOCUMENTS

| 7,950,066 B1 * | 5/2011 | Zuili ............................... 726/33 |
| 2006/0117178 A1 * | 6/2006 | Miyamoto et al. ............ 713/165 |
| 2007/0011469 A1 | 1/2007 | Allison |

(Continued)

FOREIGN PATENT DOCUMENTS

| CN | 101114319 A | 1/2008 |
| EP | 1 662 356 | 5/2006 |

(Continued)

OTHER PUBLICATIONS

European Search Report (dated Jun. 4, 2012) for EP 10 73 6069 which corresponds to U.S. Appl. No. 13/147,287.

(Continued)

*Primary Examiner* — Vikkram Bali
*Assistant Examiner* — Tracy Mangialaschi
(74) *Attorney, Agent, or Firm* — Gottlieb, Rackman & Reisman P.C.

(57) ABSTRACT

Provided is a clipboard security system and method for improving security of data transmission made through a clipboard which is frequently used in utilization of a computer. An example of the clipboard security system includes a clipboard managing unit for storing data in a clipboard or extracting data from the clipboard in response to a request from one or more objects, in which the clipboard managing unit includes a data encrypting unit for encrypting the data for which storage is requested according to a trust relationship of an object which desires to store the data in the clipboard and a data decrypting unit for decrypting the encrypted data according to a trust relationship of an object which desires to extract the encrypted data stored in the clipboard.

22 Claims, 9 Drawing Sheets

(51) Int. Cl.
*G06F 21/55* (2013.01)
*G06F 21/62* (2013.01)

(52) U.S. Cl.
CPC . *G06F2221/2115* (2013.01); *G06F 2221/2141* (2013.01)

(56) References Cited

U.S. PATENT DOCUMENTS

| | | | |
|---|---|---|---|
| 2007/0011749 A1 | | 1/2007 | Allison |
| 2007/0016771 A1* | | 1/2007 | Allison et al. ................. 713/165 |
| 2007/0101435 A1* | | 5/2007 | Konanka et al. ................. 726/27 |

FOREIGN PATENT DOCUMENTS

| | | |
|---|---|---|
| JP | 11-249965 A | 9/1999 |
| JP | 2005-148913 A | 6/2005 |
| JP | 2005-242519 A | 9/2005 |
| JP | 2006-155155 | 6/2006 |
| JP | 2007-65846 A | 3/2007 |
| JP | 2008-217449 A | 9/2008 |
| JP | 2008226196 A | 9/2008 |
| JP | 2008-250412 | 10/2008 |
| JP | 2010-9490 A | 1/2010 |
| JP | 2010-55371 A | 3/2010 |
| KR | 10-2000-0014601 | 3/2000 |
| KR | 10-2002-0005401 | 1/2002 |
| WO | WO 2007/008808 | 1/2007 |
| WO | 2007/061119 A1 | 5/2007 |
| WO | 2007/103752 A2 | 9/2007 |

OTHER PUBLICATIONS

Office Action issued by the Japanese Patent Office in a corresponding Japanese patent application No. 2011-547810, Jan. 29, 2013.

* cited by examiner

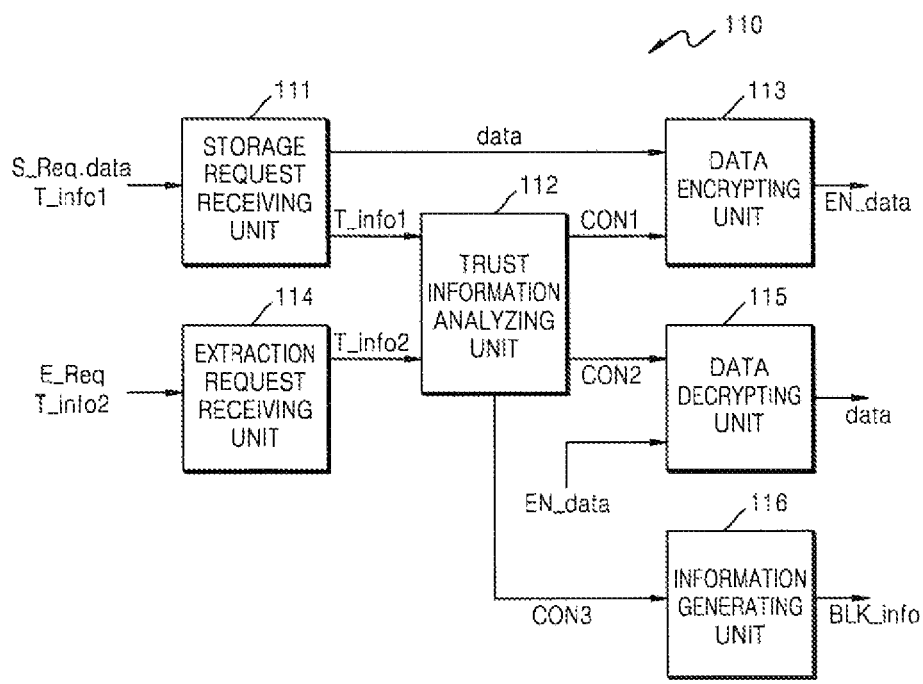
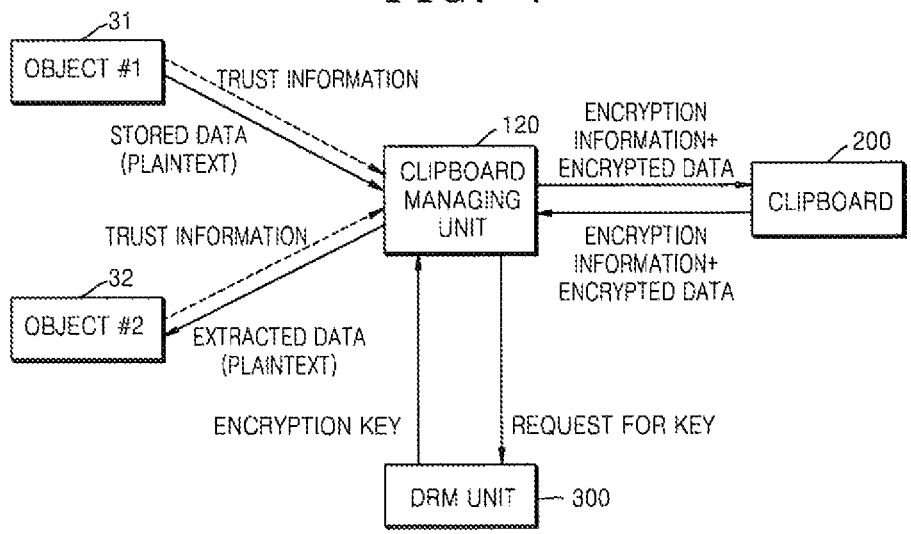

SYSTEM AND METHOD FOR CLIPBOARD SECURITY

TECHNICAL FIELD

The present invention relates to a clipboard security system and method, and more particularly, to a clipboard security system and method which is capable of improving the security of data transmission performed through a clipboard that is frequently used in utilization of a computer.

BACKGROUND ART

In various operating systems, to deliver arbitrary program data to other places, a clipboard or a space similar to the clipboard is provided and is regarded as one of operating system functions frequently used in utilization of a computer. Data delivery through a clipboard basically does not take security into account, and consequently, any program executed in an operating system can use data stored in the clipboard.

FIG. 1 is a diagram showing a situation in which data is stored in a clipboard provided by an operating system and data is extracted in response to a request for the data, and it can be seen from FIG. 1 that application programs being executed can freely store data in a clipboard 1 as a plaintext and extract data from the clipboard 1 for utilization of the data. For example, data stored by an application program #2 5 may be extracted to be pasted to a document 2 3 which is being edited by an application program #1 4; data stored in the document 2 3 which is being edited by the application program #1 4 may be extracted to be pasted to a document 1 2; and data stored in the document#1 2 may be extracted to be pasted to the document 1 2.

Since data in a clipboard is freely delivered between arbitrary programs capable of using a format of the data, a simple text, a rich text, a picture, and information having a particular format may be delivered between programs capable of using such information. Information delivery made between programs through a clipboard is undoubtedly an efficient method of properly using a multitasking function of an operating system, but as the security of important data is increasingly demanded, data transmitted between independent programs through the clipboard needs to be protected. For example, even if during management of a security document, a strict management function is introduced which disallows production of a copy of the document to prevent leakage of contents of the document or disallows delivery of the document to other storage places or transmission of the document to outside, the contents of the security document may be leaked by being transmitted as an unrestricted general document with the use of a clipboard or someone unauthorized may peep into contents stored in the clipboard. Therefore, it is necessary to enhance security by managing, data transmission performed through a clipboard. Although there are applications for managing plural temporarily-stored information by extending a clipboard (such as a scrapbook of Macintosh and clipboard extension applications (many pastes, a multi-clipboard, a clip tray, a tray text, etc.)), these applications merely provide a function of storing a plurality of, mainly, plain texts and selecting and using a desired one among the stored plain texts, and do not provide any function related to security. Moreover, with introduction of a digital rights management (DRM) system, when particular contents are provided, management for blocking a clipboard function is performed to prevent production of a copy of the contents, but such management is merely blocking of the clipboard function, significantly degrading the efficiency of a computer work performed through the clipboard.

In other words, since a clipboard, which is a basic function of an operating system, is frequently used in various computer works such as a document work, a picture work, a program work, a presentation work, and so forth, if the clipboard is blocked, the work efficiency is significantly degraded. Therefore, it is necessary to effectively control delivery of a security-demanding data through the clipboard in a state where the use of the clipboard is permitted.

To control use of a clipboard, a means for integrated management of use of the clipboard has been applied, but due to low trust or reliability thereof, the means is difficult to use for a security purpose for preventing leakage of information. That is, a conventional clipboard management means is configured to prevent security-demanding information from being delivered to an unreliable or untrusty place by controlling a flow of information, and in this configuration, every information flow for the clipboard has to be thoroughly monitored, and if such information control fails at a single position, information leakage occurs. Moreover, by nature of a terminal where various events occur, trust is low. Therefore, there is an urgent need for a clipboard security scheme which guarantees free use of a clipboard, trust in control of security contents, and explicit trust in preventing information leakage.

DISCLOSURE OF THE INVENTION

Technical Problem

An object of embodiments of the present invention newly proposed to effectively control security-demanding data in a clipboard-use permitted state is to provide a clipboard security system and method which encrypts data delivery contents of a clipboard, which are destined to an object capable of data copy and extraction, such as security-demanding applications or documents, to deliver data between trusty security objects through the clipboard and to prevent delivery of data stored in the clipboard from a security object to an untrusty object or to deliver the data in an encrypted state, thereby preventing leakage of security data.

Another object of embodiments of the present invention is to provide a clipboard security system and method which provides a clipboard managing unit to encrypt data provided from a trusty object, store the encrypted data in a clipboard, and decrypt and provide clipboard data requested from a trusty object.

Still another object of embodiments of the present invention is to provide a clipboard security system and method which, in a terminal having applied thereto a digital rights management (DRM) unit for managing security-demanding information with a secret key, trust recognition and secret key securement, which are necessary for encryption and decryption of clipboard-using data between trust objects, are performed using the DRM unit, thereby improving security and application convenience.

Further another object of embodiments of the present invention is to provide a clipboard security system and method which monitors both use of a clipboard by trusty objects and use of the clipboard by untrusty objects to encrypt security-demanding data and apply the encrypted data to the clipboard, provide a decrypted plaintext to a trusty object, and notify an untrusty object of emptiness of the clipboard instead of delivering encrypted data to the untrusty object, thereby guaranteeing control and stability of the use of the clipboard.

Further another object of embodiments of the present invention is to provide a clipboard security system and method which generates encryption related information and forgery protection information during security data encryption to allow clipboard management through such information, thus improving stability and independency, and implements a clipboard managing unit in various schemes including an application programming interface (API) or hooking or a combination thereof, thus improving security and stability.

Yet another object of embodiments of the present invention is to provide a clipboard security system and method which, during storage of information in a clipboard through screen capture, controls the information to be delivered only to an object which a security-target object relies on according to execution or exposure of the security-target object, thereby preventing data leakage caused by the screen capture.

Technical Solution

To achieve the foregoing objects, a clipboard security system according to an embodiment of the present invention includes a clipboard managing unit for storing data in a clipboard or extracting data from the clipboard in response to a request from one or more objects, in which the clipboard managing unit includes a data encrypting unit for encrypting the data for which, storage is requested according to a trust relationship of an object which desires to store the data in the clipboard and a data decrypting unit for decrypting the encrypted data according to a trust relationship of an object which desires to extract the encrypted data stored in the clipboard.

A clipboard security system according to another embodiment of the present invention includes a clipboard for temporarily storing data and a clipboard managing unit positioned between one or more objects and the clipboard to control storage of data requested from the objects in the clipboard and extraction of data from the clipboard, encrypt the data in response to trust information provided from the objects, store the encrypted data in the clipboard, or decrypt the encrypted data stored in the clipboard in response to the trust information provided from the objects and provide the decrypted data to the objects.

A clipboard security method according to an embodiment of the present invention includes clipboard security method for managing use of a clipboard by one or more objects, the clipboard security method including receiving first information including data from a first object, determining whether the first information includes trust information corresponding to the first object, selectively performing an encryption operation with respect to the received data according to a result of the determination, and storing the encrypted data in the clipboard.

Advantageous Effects

A clipboard security system and method according to embodiments of the present invention encrypts data delivery contents of a clipboard, which are destined to an object capable of data copy and extraction, such as security-demanding applications or documents, to deliver data between trusty security objects through the clipboard and to prevent delivery of data stored in the clipboard from a security object to an untrusty object or to deliver the data in an encrypted state, thereby preventing leakage of security data while maintaining the efficiency of a work using the clipboard.

A clipboard security system and method according to embodiments of the present invention a clipboard security system and method which provides a clipboard managing unit to encrypt data provided from a trusty object, store the encrypted data in a clipboard, and decrypt and provide clipboard data requested from a trusty object, thereby disallowing an untrusty object to check contents of information in the clipboard even if the untrusty object secures the information and thus improving security.

A clipboard security system and method according to embodiments of the present invention a clipboard security system and method which, in a terminal having applied thereto a digital rights management (DRM) unit for managing security-demanding information with: a secret key, trust recognition and secret key obtaining, which are necessary for encryption and decryption of clipboard-using data between trust objects, are performed using the DRM unit, thereby improving security and application convenience.

A clipboard security system and method according to embodiments of the present invention a clipboard security system and method which generates encryption related information and forgery protection information during security data encryption to allow clipboard management through such information, thus improving stability and independency, and implements a clipboard managing unit in various schemes including an application programming interface (API) or hooking or a combination thereof, thus improving security and stability.

A clipboard security system and method according to embodiments of the present invention a clipboard security system and method which, during storage of information in a clipboard through screen capture, controls the information to be delivered only to an object which a security-target object relies on according to execution or exposure of the security-target object, thereby preventing data leakage caused by the screen capture.

BRIEF DESCRIPTION OF THE DRAWINGS

FIGS. 5 and 6 are structural diagrams for describing an operating scheme of an extended clipboard security system according to an embodiment of the present invention;

FIGS. 7 and 8 are structural diagrams for describing an operating scheme of a digital rights management (DRM) unit-linked clipboard security system according to an embodiment of the present invention;

MODE FOR CARRYING OUT THE INVENTION

The present invention will be described in detail with reference to the attached drawings and embodiments.

Figure 1:
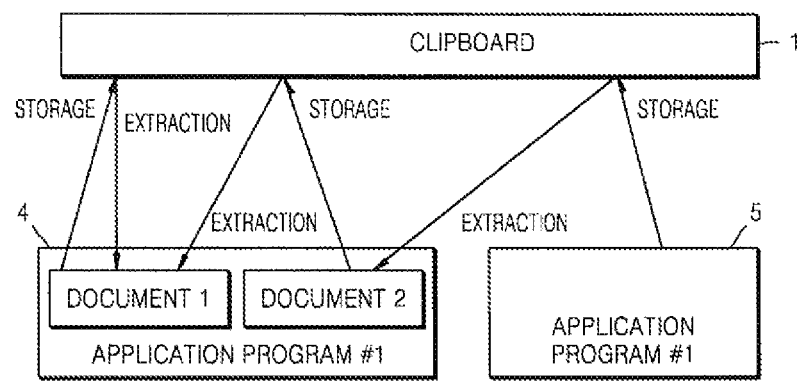
FIG. 1 is a conceptual diagram for describing a general clipboard use scheme.
Figure 2:
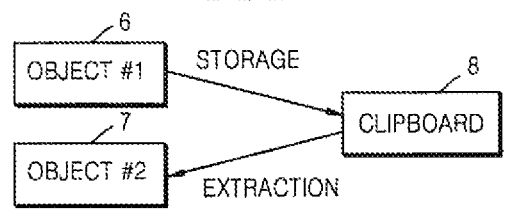
FIG. 2 is a conceptual diagram showing a relationship between a clipboard and a use object.

FIG. 2 is a conceptual diagram for clarifying an object capable of using a clipboard. There are various types of objects capable of using a clipboard, such as various application programs, separate documents managed by the application programs, various sub-windows including edit windows, and thus they will be collectively referred to as 'objects' in a current embodiment of the present invention. Generally, in the field of computer science, an object means a storage space or an allocated space or a concept including materials or commands, but in a general sense, an object means an object which is subject to independent recognition or an object which executes an operation. Consequently, in the current embodiment, the object will be regarded as an independent object which executes an operation of extracting and pasting data from a clipboard.

That is, an object #1 6 may store data in a clipboard 8 and an object #2 7 may extract and paste data stored in the clipboard 8. The objects #1 6 and #2 7 may be various objects such as application programs, documents, sub-windows, and so forth.

A clipboard in which data unspecifiedly provided from various objects is stored and data unspecifically requested from various objects is extracted is vulnerable to security in spite of convenience, and to prevent such vulnerability, control of data storage and extraction is required.

Figure 3:
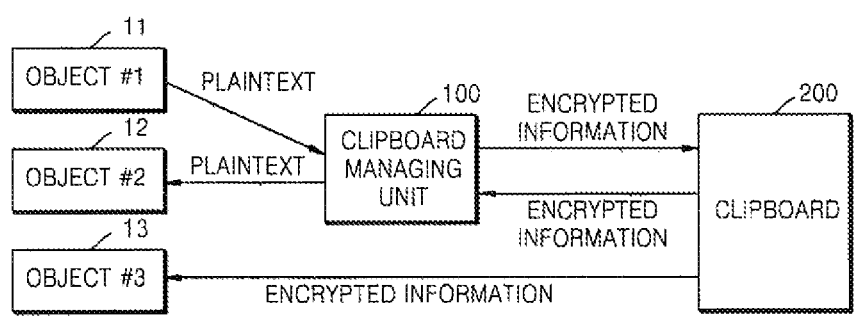
FIGS. 3 and 4 are structural diagrams for describing an operating scheme of a clipboard security system according to an embodiment of the present invention.
Figure 4:
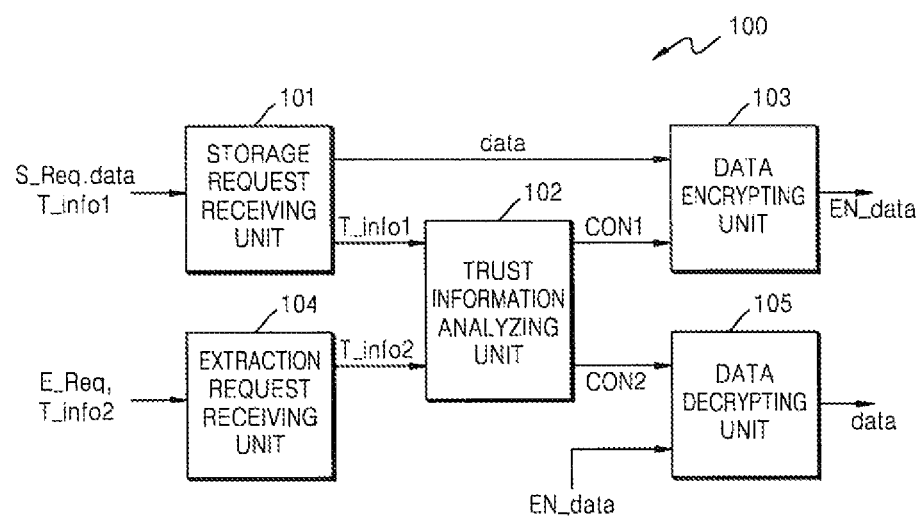

FIGS. 3 and 4 show concepts of a clipboard security system according to an embodiment of the present invention. As shown in FIG. 3, to manage access between objects #1 11 and #2 12 and a clipboard 200, a clipboard managing unit 100 may be provided in the system. Management of access may mean managing storage/extraction of data when the object #1 11 and the object #2 12 request storage of the data in the clipboard 200 or extraction of the data from the clipboard 200. When the object #1 11, which is a security-demanding trusty object, requests storage of data in the clipboard 200, the clipboard managing unit 100 encrypts plaintext data and stores the encrypted plaintext data in the clipboard 200; when the object #2 12 which demands security like the object #1 11 and the object #1 11 may rely on requests extraction of data stored in the clipboard 200, the clipboard managing unit 100 decrypts the stored encrypted data and provides the decrypted data to the object #2 12.

An object #3 13 which the object #1 11 cannot rely on may request extraction of encrypted data stored in the clipboard 200 and obtain the corresponding encrypted data according to the foregoing process, but the corresponding data cannot be used because of being encrypted.

In other words, when a clipboard is used between objects having trust therebetween, the clipboard managing unit 100 encrypts a plaintext and decrypts encrypted data into a plaintext, such that respective objects obtain the same result as in general clipboard use, but in practice, since data stored in the clipboard has been encrypted, an untrusty object, even if obtaining stored data from a security-demanding object, cannot use the obtained data. Therefore, security-demanding data is stored in the clipboard as being in an encrypted state, regardless of how a terminal's environment is changed and how a system operating state is changed, such that the possibility of leakage of contents of the data is fundamentally blocked.

With the foregoing structure, it is not necessary to monitor clipboard input and output of every object for safe data transmission, facilitating management.

Herein, when it is said the object #1 11 relies on the object #2 12, it means that encrypted data obtained by encrypting data provided by the object #1 11 can be decrypted by the object #2 12, and a general trusty object is an object using security-demanding data, such that the trusty object encrypts the security-demanding data first before storing the data in the clipboard, and for encrypted data provided from a trusty object among the stored encrypted data, obtains plaintext data by decrypting the encrypted data. On the other hand, an untrusty object uses data which does not demand security. Thus, in actual implementation, a trusty object has to provide information indicating that it is a trusty object or information identifying trust (e.g., in case of a corporation, a corporation's unique number, and in case of a particular user group, a unique number of the group) to the clipboard managing unit 100 or the clipboard managing unit 100 has to be able to check corresponding information (e.g. registration user information, etc. of the object (application)).

FIG. 4 is a block diagram of an example for implementing the clipboard managing unit 100 shown in FIG. 3. In FIG. 4, various components for performing a function of the clipboard managing unit 100 are shown as blocks. However, the function of the clipboard managing unit 100 may also be implemented with software, and to this end, codes for performing various functional blocks shown in FIG. 4 may be executed by a computer to execute the function of the clipboard managing unit 100.

As shown in FIG. 4, the clipboard managing unit 100 may include a storage request receiving unit 101 for receiving a request for storage of data in clipboard from an object and an extraction request receiving unit 104 for receiving a request for extraction of data stored in the clipboard from the object. When the security-demanding trusty object requests data storage/extraction, the clipboard managing unit 100 may include a trust information analyzing unit 102 which receives trust information from the trusty object and analyzes the received trust information. The clipboard managing unit 100 may further include a data encrypting unit 103 for encrypting data which is requested to be stored in the clipboard according to an analysis result of the trust information analyzing unit 102 and a data decrypting unit 105 for decrypting encrypted data extracted from the clipboard according to an analysis result of the trust information analyzing unit 102.

The storage request receiving unit 101 receives a storage request S_Req and data data from an object. When the object is a trusty object, the storage request receiving unit 101 further receives trust information T_info1 indicating so. The trust information T_info1 it delivered to the trust information analyzing unit 102.

In the trust information analyzing unit 102 may be previously set and stored trust information related to objects for which a security operation is performed by the clipboard security system according to the present invention. Thus, the trust information analyzing unit 102 analyzes the trust information T_info1 of an object provided from the storage request receiving unit 101 to determine whether the object, which has generated the storage request S_Req?, is a trusty object, and provides a control signal CON1 corresponding to a determination result to the data encrypting unit 103. The data encrypting data 103 performs an encryption operation with respect to the data data in response to the control signal CON1. For example, if the trust information T_info1 is not provided to the trust information analyzing unit 102 or the trust information T_info1 provided to the trust information analyzing unit 102 is analyzed as not corresponding to an object for which security is performed by the system, the data encrypting unit 103 skips an encryption operation and stores plaintext data data in the clipboard. On the other hand, if the object is analyzed as an object which demands security, the data data is encrypted and encrypted data EN_data is stored in the clipboard. Although it is shown in FIG. 4 that the data data is provided from the storage request receiving unit 101 to the data encrypting unit 103, the data data may also be provided directly to the data encrypting unit 103.

Other objects than the object may also request data extraction from the clipboard, and in this case, the extraction request receiving unit 104 receives an extraction request E_Req and trust information T_info2 of the object from the object which has requested data extraction. As mentioned previously, if the object requesting data extraction is an untrusty object, the trust information T_info2 is not provided to the extraction request receiving unit 104. The trust information analyzing unit 102 receives the trust information T_info2 of the object which has requested data extraction and analyzes the received trust information T_info2 to determine whether the object requesting data extraction is a trusty object. A control signal CON2 corresponding to a determination result may be provided to the data decrypting unit 105. The data decrypting unit 105 decrypts the encrypted data EN_data from the clipboard in response to the control signal CON2, and provides plaintext data data to the object as a result of a decryption operation.

Figure 5:
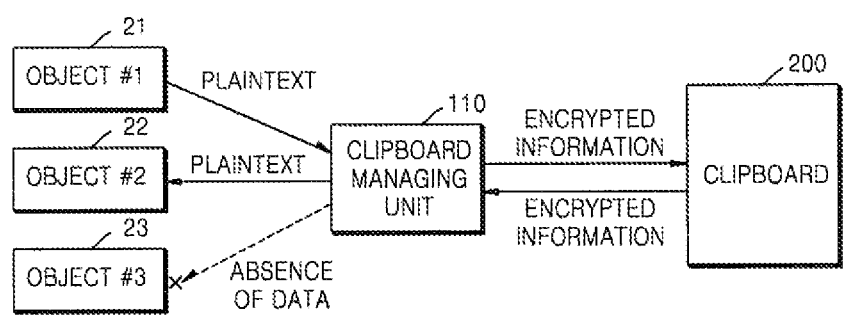

FIGS. 5 and 6 show a case where to improve user convenience and system operation stability, a clipboard managing unit 110 performs processing as if there is no data in the clipboard when an untrusty object extracts encrypted data from the clipboard.

When the encrypted data is extracted and copied by the untrusty object as shown in FIGS. 3 and 4, encrypted strings may be pasted, a data format error may occur, or other unexpected symptoms may occur, degrading stability and causing user inconvenience of having to erase erroneously pasted information or solve the error.

Accordingly, as shown in FIG. 5, when data transmission using a clipboard 200 is performed between a trusty object #1 21 and a trusty object #2 22, to provide encrypted data to an untrusty object #3 23 which desires to extract the encrypted data from the clipboard 200, the clipboard managing unit 110 may provide information indicating emptiness of the clipboard to the object #3 23 instead of providing the encrypted data to the object #3 23. To this end, a separate managing unit may be further provided, and a clipboard managing unit for managing a trusty object and a clipboard managing unit for managing an untrusty object may be separately provided.

FIG. 6 is a diagram showing an example for implementing the clipboard managing unit 110 shown in FIG. 5. Components shown in FIG. 6 which are the same as those shown in FIG. 4 will not be described in detail.

As shown in FIG. 6, the clipboard managing unit 110 may receive a storage request receiving unit 111, a trust information analyzing unit 112, a data encrypting unit 113, an extraction request receiving unit 114, and a data decrypting unit 115. The clipboard managing unit 110 may further include an information generating unit 116 for generating information indicating emptiness of a clipboard if an untrusty object requests extraction of encrypted data stored in the clipboard when an object requests extraction of data stored in the clipboard.

The extraction request receiving unit 114 receives an extraction request E_Req or data stored in the clipboard from the object. If a trusty object requests data extraction, the trust information T_info2 in addition to the extraction request E_Req is provided to the extraction request receiving unit 114. On the other hand, if the untrusty object requests data extraction, the trust information may not be provided to the extraction request receiving unit 114 or unauthorized trust information may be provided to the extraction request receiving unit 114. The trust information analyzing unit 112 analyzes if the trust information is provided from the object requesting data extraction or if the trust information provided from the object requesting data extraction is an object suitable as a security object, and generates a corresponding control signal. For example, if the object requesting data extraction is a suitable trust object demanding security, the control signal CON2 is generated to activate the data decrypting unit 115. On the other hand, if the object requesting data extraction is an untrusty object, the control signal CON2 is generated to activate the information generating unit 116, such that information BLK_info indicating emptiness of the clipboard is provided to the untrusty object.

Figure 8:
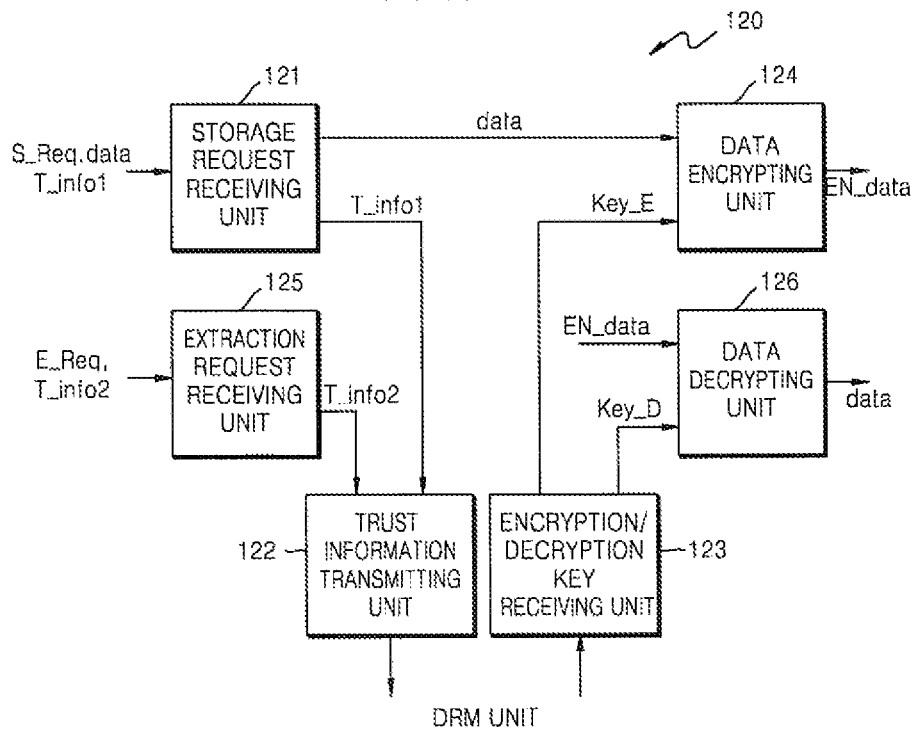

FIGS. 7 and 8 are conceptual diagrams showing a detailed operating process when the foregoing clipboard security system is applied to or interworks with a DRM system, or adopts a DRM means, in which trust determination with respect to a trusty object and generation of keys necessary for encryption and decryption are performed, by a DRM unit 300. Herein, the DRM unit 300 may be provided in a terminal or a remote server connected through a network, and has established security for management of generally known keys (encryption and decryption keys such as a symmetric key, a secrete key, a public key, etc.) and management of trust information, thus improving security when the DRM unit 300 is used or interworks. A function of the shown DRM unit 300 provided in the current embodiment may be embedded in a clipboard managing unit 120 to configure a dedicated structure for the clipboard security system.

If there are a trusty object #1 31 and a trusty object #2 32 as shown in FIG. 7, when the trusty object #1 31 desires to store plaintext data in the clipboard, the clipboard managing unit 120 obtains corresponding data and trust information of the object #1 31 (information indicating a trust relationship, e.g., a sort of trust identifier such as corporation unique information for a corporation), generates encryption-related information while encrypting the received data, and stores the generated encryption-related information together with the encrypted data in a clipboard 200. In this case, of the encryption-related information, information which should not be exposed is encrypted and included in the encrypted data. When the object #2 32 requests data extraction from the clipboard 200, the clipboard managing unit 120 obtains the encrypted data and its related encryption information from the clipboard 200 to check a trust relationship based on the trust information obtained from the object #2 32, decrypts the encrypted data, and provides plaintext data to the object #2 32.

In this process, the trust relationship between the encryption information and the object may be checked by the clipboard managing unit 120, but as is shown, if the DRM unit 300 having a superior security function manages a secret key for controlling security information and trust information for security-demanding objects, trust or the trust relationship between objects may be checked through the DRM unit 300 and as a result thereof, a secret key (or particular encryption/decryption-related key or information) may be obtained.

In other words, the shown clipboard managing unit 120 obtains trust information from the object #1 31 and provides the same to the DRM unit 300 which analyzes the trust information and provides a secret key to the clipboard managing unit 120 according to an analysis result. The clipboard managing unit 120 encrypts the data by using the provided secret key and stores the encrypted data in the clipboard 200. The clipboard managing unit 120 obtains trust information from the object #2 32 and provides the same to the DRM unit 300 which then analyzes the trust information and provides a secret key to the clipboard managing unit 120 according to an analysis result. The clipboard managing unit 120 may decrypt the encrypted data stored in the clipboard 200 by using the provided secret key.

Various information may be generated as the encryption information, and may include, for example, an encryption identifier for expressing encryption or non-encryption with a plaintext, trust identification information indicating trust of an object as additional information necessary for checking a trust relationship, and an authorization code for preventing forgery of encrypted information. Among them, the information except for the encryption identifier should not be exposed, and thus may be encrypted in a manner similar to or the same as data to be encrypted and may be included in the encrypted data.

To generate the authorization code for preventing forgery, a key value is required. The key value may use, for example, unique information of a terminal such as a medium access control (MAC) address of a network card included in the terminal or a serial number of a central processing unit of the terminal, or the secret key obtained in the DRM unit 300. By doing so, it is guaranteed that the encrypted data obtained from the clipboard 200 will be identical to the original value stored in the clipboard 200.

To sum up, security-demanding data stored in the clipboard, even if being leaked, is safe, thus alleviating a burden of flow management and maintaining the trust of security. Moreover, even when a plurality of clipboard managing units exist and a clipboard managing unit is operated again due to a problem occurring therein, decryption may be performed using encryption Information stored in the clipboard, thereby maintaining the stability of the clipboard security system at all times.

FIG. 8 is a diagram showing an example for implementing the clipboard managing unit 120 shown in FIG. 7. As shown in FIG. 8, the clipboard managing unit 120 may include a storage request receiving unit 121, a data encrypting unit 124 an extraction request receiving unit 125, and a data decrypting unit 126. When the clipboard security system shown in FIG. 7 further includes the DRM Unit 300 or the DRM, unit 300 is a system outside the clipboard security system, the clipboard managing unit 120 provides trust information of an object to the DRM unit 300 and receives an encryption/decryption key for encrypting/decrypting data from the DRM unit 300. To this end, the clipboard managing unit 120 may further include a trust information transmitting unit 122 and an encryption/decryption key receiving unit 123.

The trust information transmitting unit 122 receives trust information T_info1 and T_info2 provided from an object which requests data storage or data extraction, and delivers them to the DRM unit. The DRM unit analyzes the trust information T_info1 and T_info2 to determine whether the object requesting data storage or data extraction is a trusty object. If the requesting object is analyzed as a trusty object, a determination result, encryption/decryption keys Key_E and Key_D are provided to the clipboard managing unit 120. The encryption/decryption key receiving unit 123 provides the provided encryption/decryption keys Key_E and Key_D to a data encrypting unit 124 and a data decrypting unit 126. As mentioned previously, in addition to the encrypted data EN_data with respect to the data data, an encryption identifier, trust identification information, and an anti-forgery authorization code may be further generated. Since the trust identification information and the anti-forgery authorization code should not be exposed to an untrusty object, encrypted trust identification information and anti-forgery authorization code may be generated using the encryption/decryption keys Key_E and Key_D provided from the encryption/decryption key receiving unit 123. The data encrypting unit 124 shown in FIG. 8 may generate such information, or a separate encryption information generator (not shown) for generating the foregoing information may be further included in the system.

Figure 9:
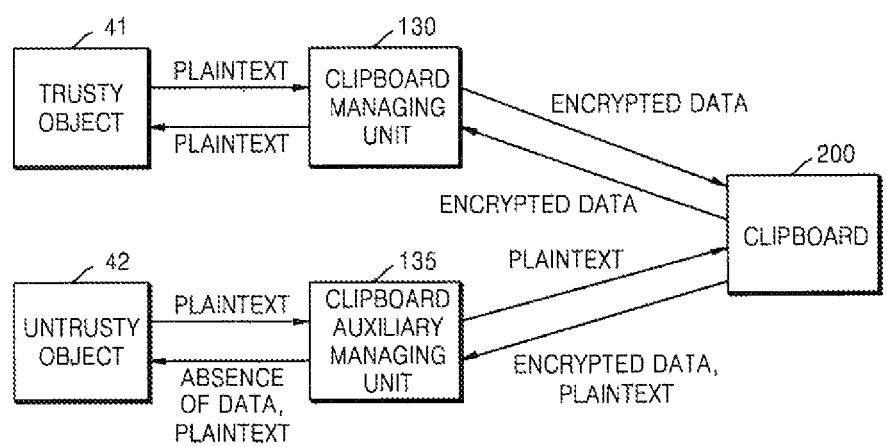
FIG. 9 is a structural diagram for describing an operation of a clipboard managing unit dividing scheme according to an embodiment of the present invention.

FIG. 9 shows an example where clipboard managing units are divided according to their functions. Unlike in the example shown in FIG. 5 where the clipboard managing unit as a single functional unit delivers encrypted data between trusty objects and disallows delivery of encrypted contents of a clipboard to an untrusty object, in FIG. 9, a clipboard auxiliary managing unit 135 is provided separately from a clipboard managing unit 130 for executing encryption and decryption to perform a function of disallowing delivery of encrypted contents of a clipboard to an untrusty object.

As is shown, the clipboard managing unit 130 takes full charge of encrypting plaintext data provided by a trusty object 41, storing the encrypted data in the clipboard 200, and decrypting the encrypted data to provide the data as a plaintext to the trusty object 41. In other words, a clipboard data flow for the trusty object 41 is processed by the clipboard managing unit 130. Accordingly, the clipboard managing unit 130 encrypts plaintext data provided by the trusty object 41 to generate encrypted data and stores the encrypted data in the clipboard 200. The clipboard managing unit 130 also extracts the encrypted data from the clipboard, 200 to perform a decryption operation, thus providing plaintext data to the trusty object 41.

Meanwhile, a data flow between an untrusty object 42 and the clipboard 20 is processed by the clipboard auxiliary managing unit 135. Thus, the clipboard auxiliary managing unit 135 manages storage/extraction requests for data with respect to the untrusty object 42, such that the clipboard auxiliary managing unit 135 stores plaintext data provided from the untrusty object 42 in the clipboard 200, and upon receiving a data extraction requests from the untrusty object 42, provides the data stored in the clipboard 200 to the untrusty object 42 (that is, the plaintext data is bypassed). The clipboard auxiliary managing unit 135, in performing the data extraction operation, determines whether the data extracted from the clipboard 200 is encrypted data and the determination operation may be performed by detecting whether a plaintext encryption identifier exists in the data stored in the clipboard 200. If the extraction-requested data stored in the clipboard 200 is encrypted data, the clipboard auxiliary managing unit 135 delivers information indicating emptiness of the clipboard 200 to the untrusty object 42.

The clipboard managing unit 130 and the clipboard auxiliary managing unit 135 are functionally separated, but may be substantially divided according to operation modes in a single module.

Figure 10:
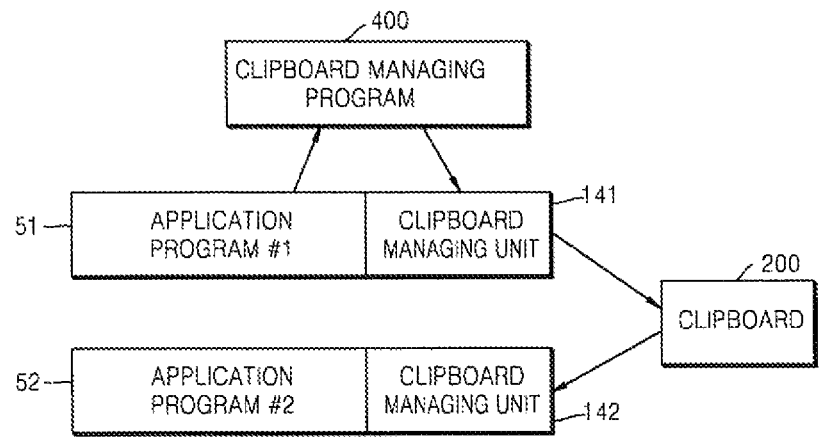
FIG. 10 is a conceptual diagram for describing an operating scheme of a clipboard managing unit according to an embodiment of the present invention.
Figure 11:
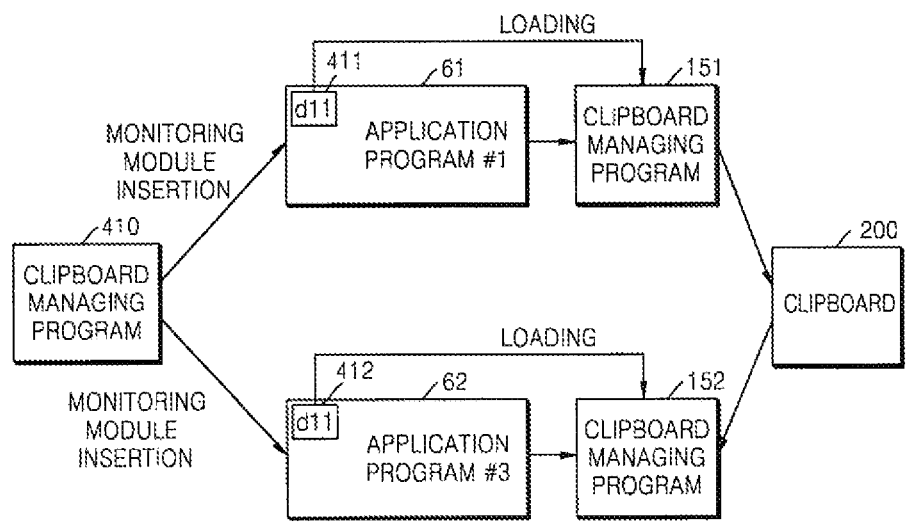
FIG. 11 is another conceptual diagram for describing an operating scheme of a clipboard managing unit according to an embodiment of the present invention.

FIGS. 10 and 11 are diagrams for describing a structure and an installation scheme of a clipboard managing unit for managing data delivery contents between an object and a clipboard. In FIG. 10, a program for installing the clipboard managing unit is separately downloaded or copied to be installed in a terminal for loading or execution of the clipboard managing unit, such that the clipboard managing unit is loaded for every application program, which is the unit of operation of the object, to manage data transmission with the clipboard. To this end, an application programming interface (API) is used.

That is, a clipboard managing program 400 is separately obtained and installed in the terminal, and when a security-demanding application (i.e., a trusty application) is executed, a clipboard managing unit 141 is explicitly called. In this way, every execution of a security-demanding application program, individual clipboard managing units are called and operate.

As is shown, when an application program #1 51 is executed, the clipboard managing program 400 calls the clipboard managing unit 141; when data storage with respect to the clipboard 200 is required, data encrypted through the clipboard managing unit 141 is stored in the clipboard 200. When an application program #2 52 is executed, as in the application program #1 51, the clipboard managing program 400 calls a clipboard managing unit 142; when extraction of encrypted data stored in the clipboard 200 is required, the clipboard managing unit 142 decrypts the data and delivers the decrypted data to the application program #2 52.

In other words, each clipboard managing unit is separately configured and operates for each security-demanding object (especially, each application) determined through trust relationship check.

In addition to an explicit call scheme using an application program, a hooking scheme for monitoring all objects without a modification of an application program may also be used as shown in FIG. 11.

As is shown, once a clipboard managing program 410 is separately installed and executed, it inserts monitoring modules 411 and 412 into executed objects (mainly, application programs) 61 and 62, respectively. The monitoring modules 411 and 412 are inserted into respective application programs in the form of a DLL (dynamic link library), and the monitoring modules 411 and 412 load clipboard managing units 151 and 152, respectively, to perform data encryption and decryption.

The monitoring modules 411 and 412 loads different clipboard managing units according to whether inserted objects are trusty (that is, whether security is demanded), such that monitoring modules 411 and 412 load a clipboard managing unit for performing encryption and decryption for a trusty object and load a clipboard auxiliary managing unit for notifying absence of encrypted clipboard contents for an untrusty object. Alternatively, also for the untrusty object, the clipboard managing unit may be loaded and the clipboard managing unit may perform the function of notifying absence of encrypted clipboard contents.

By applying both schemes shown in FIGS. 10 and 11, a predetermined object may explicitly call a clipboard managing unit implemented with an API and another object may call a clipboard managing unit implemented with a hooking scheme.

Figure 12:
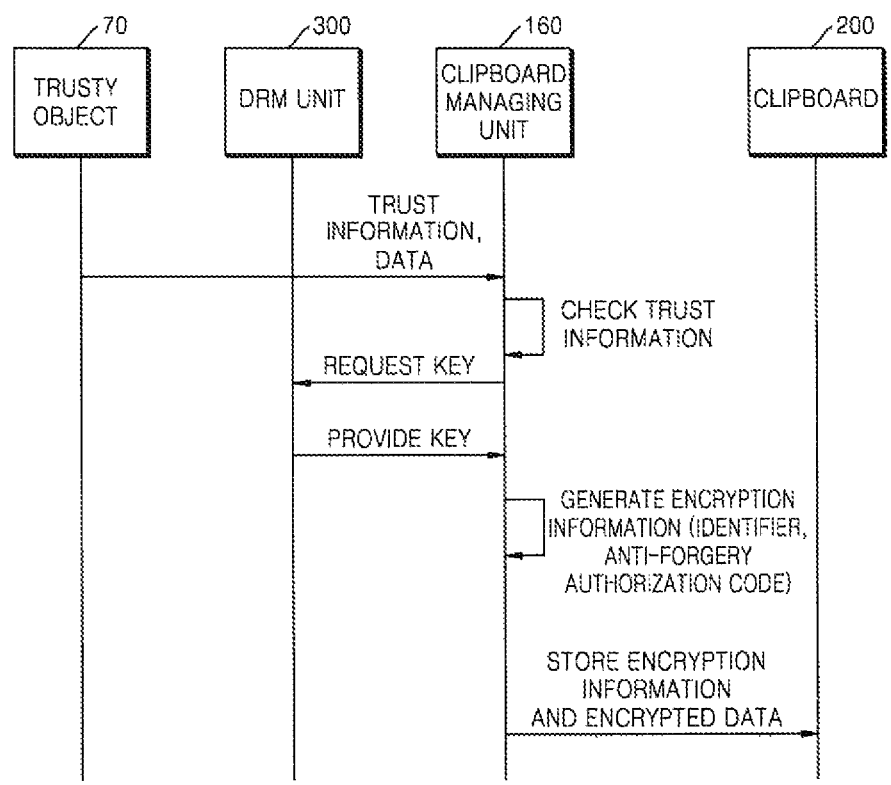
FIGS. 12 and 13 are signal flow diagrams for describing an operating process of a clipboard security system according to an embodiment of the present invention.
Figure 13:
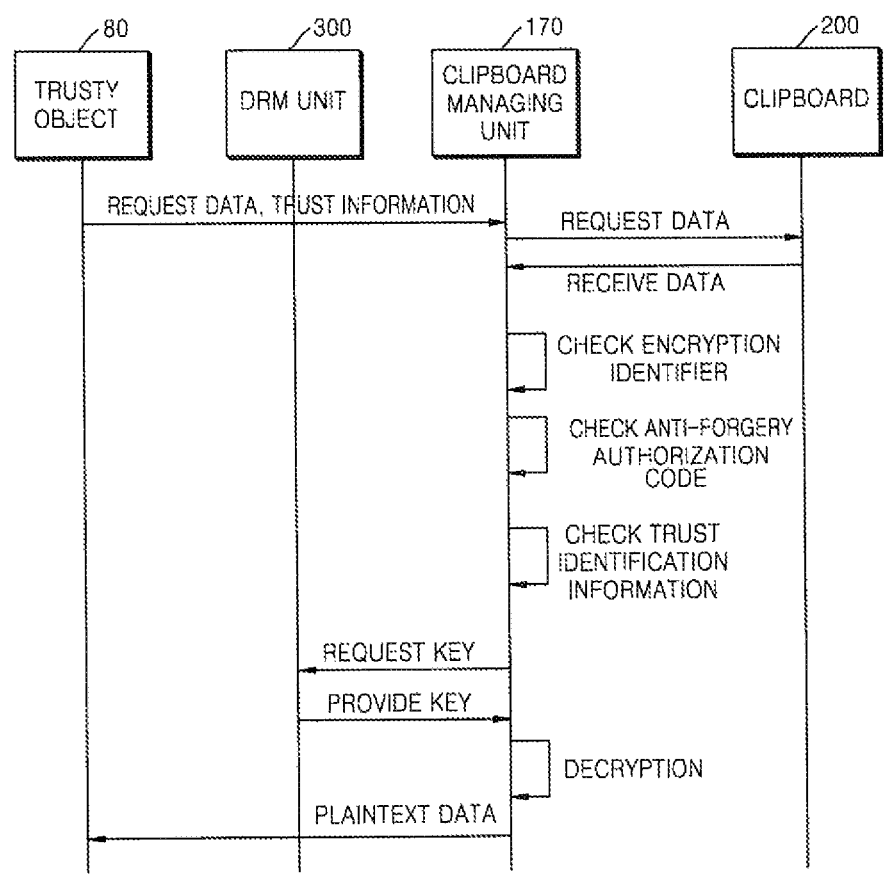

FIGS. 12 and 13 are signal flows diagrams for describing an operating process of a clipboard security system using a DRM unit as shown in FIG. 7 according to an embodiment of the present invention, in which when the DRM unit 300 is not used, its corresponding function may be performed by a clipboard managing unit instead.

FIG. 12 shows an operating process of a clipboard managing unit 150 which receives data from a trusty object 70, encrypts the data, and stores the encrypted data in the clipboard 200. As is shown, when the trusty object 70 desires to store data in the clipboard 200, the clipboard managing unit 160 obtains the data to be stored and trust information of the trusty object 70. The trust information may be explicitly provided from the trusty object 70, or the clipboard managing unit 160 may extract the trust information from the trusty object 70. The clipboard managing unit 160 obtains the trust information and delivers the obtained trust information to the DRM unit 300 to obtain a key corresponding to the trust information. If the DRM unit 300 is not used, the key corresponding to the trust information may be internally provided.

The data is encrypted using the obtained key, and by using various information necessary for the encryption, encryption information is generated. The encryption information may include an encryption identifier which is inserted as a plaintext to indicate encryption or non-encryption, an authorization code for preventing forgery, and trust information for checking a trust relationship, and the authorization code and the trust information are encrypted using the key or a separate key and then included in the encrypted data to be stored in the clipboard 200. To rapidly check encryption or non-encryption, the encryption identifier may be inserted as a plaintext in a front portion of the encrypted data.

In this way, through the encryption information stored in the clipboard 200, encryption or non-encryption may be checked, and if it is determined that the information has been encrypted, the trust information and the anti-forgery authorization code are secured from the encryption information to know decryption or non-decryption and necessary basic information, such that decryption of the encrypted data is possible. The clipboard managing unit 160 which has performed encryption is not needed any longer for this end, and when another clipboard managing unit checks clipboard contents, appropriate decryption is possible, thus providing independency.

FIG. 13 shows a process of extracting data from the clipboard 200 which stores encryption information, in which the DRM unit 300 is used, but a function thereof may also be provided in a clipboard managing unit 170.

When a trusty object 80 requests data extraction from the clipboard 200, the clipboard managing unit 170 checks the extraction request and obtains trust information from the trusty object 80. The clipboard managing unit 170 requests data extraction from the clipboard 200 to receive encryption information.

The clipboard managing unit 170 then checks the received encryption information to recognize that the received information has been encrypted through a plaintext encryption identifier, and checks if the received encryption information is identical to the original value stored in the clipboard by using the anti-forgery authorization code.

If there is no error in the foregoing process, trust identification information is checked, and to this end, by using the trust information obtained from the trust object 80 and trust information extracted from the encrypted data (trust identification information), a trust relationship between the trust objects is checked. In other words, the trust information may be identical or different and if they are different, a unidirectional or bidirectional trusty relationship or an untrusty relationship may be checked.

If a trust relationship is checked through the trust information extracted from the data and the trust information obtained from the trusty object 80, the trust information obtained from the trusty object 80 is provided to the DRM unit 300 to obtain a corresponding key. This operation may be performed by the clipboard managing unit 170.

The clipboard managing unit 170 decrypts the encrypted data by using the key obtained through the DRM unit 300, and delivers plaintext data to the trusty object 80.

Although not shown in detail, when a clipboard managing unit receives a data extraction request signal from an untrusty object, trust information may not be obtained or even if the trust information is obtained, a trust relationship with trust information extracted from encrypted data becomes an untrusty relationship, and therefore, the encrypted data is not decrypted and a signal indicating absence of data in the clipboard is delivered to the untrusty object. This operation may be performed by the clipboard auxiliary managing unit.

Figure 14:
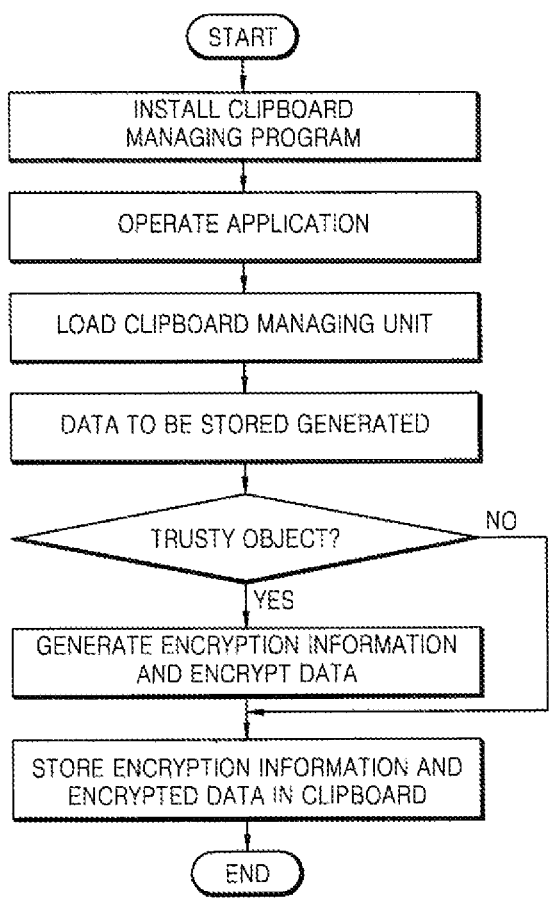
FIGS. 14 and 15 are flowcharts for describing an operating process of a clipboard security system according to an embodiment of the present invention.
Figure 15:
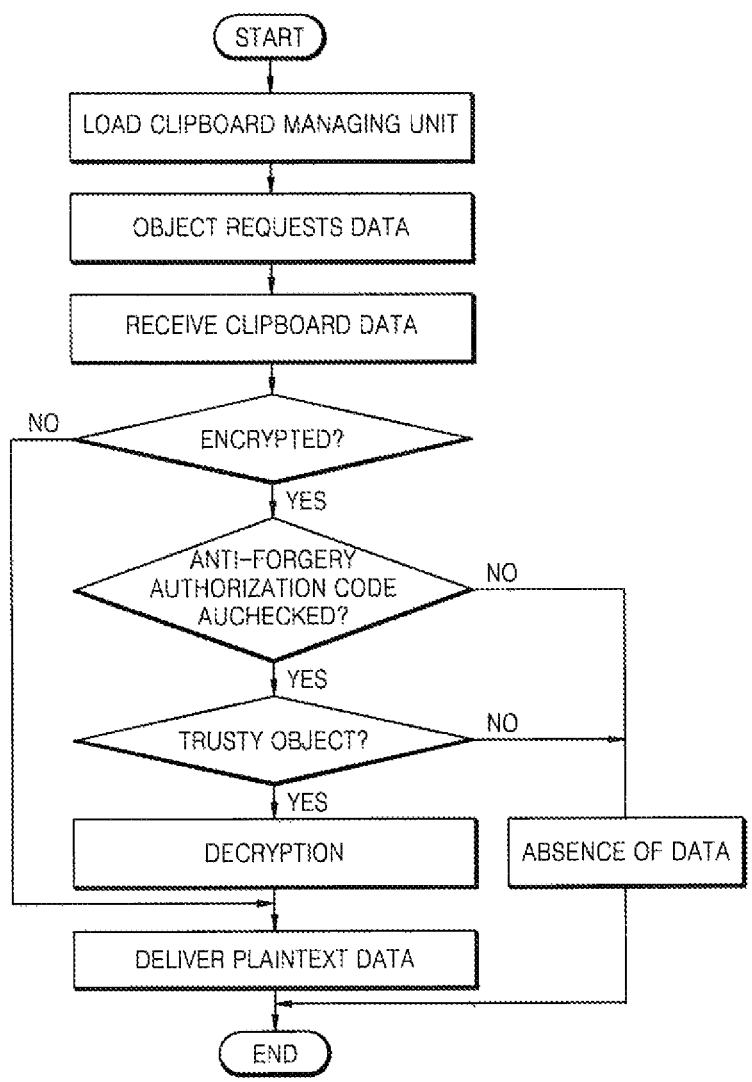

FIGS. 14 and 15 are flowcharts showing an operating process of a clipboard security system. FIG. 14 shows a process of encrypting data and storing the encrypted data in a clipboard, and FIG. 15 shows a process of decrypting data encrypted and stored in the clipboard and extracting the decrypted data.

As shown in FIG. 14, first, a user manually installs a clipboard managing program, or the clipboard managing program is automatically installed and executed.

Thereafter, when an application, which is the basic unit of an object, is operated, a clipboard managing unit is loaded in an explicit manner or a hooking scheme to monitor an operation of the application.

When the application desires to store data in the clipboard, the clipboard managing unit senses that and checks if the application is trusty, such that if the application is a trusty object, the data is encrypted and at the same time, related encryption information is generated, and the encrypted data and the related encryption information are stored in the clipboard. If the application is an untrusty object, plaintext data is stored in the clipboard.

As shown in FIG. 15, when the clipboard managing unit is loaded, if the object requests data extraction from the clipboard, the clipboard managing unit receives clipboard data and checks through a plaintext encryption identifier if the data has be en encrypted. If the data has not been encrypted, it is delivered to the requesting object.

If the clipboard data has been encrypted, it is checked through an anti-forgery authorization code if the encrypted data has not been modified. If it is checked that the encrypted data has not been modified, it is checked if a trust relationship between trust information of the object requesting data extraction and trust information included in the encrypted data is trusty. If the trust relationship is trusty, the encrypted data is decrypted into plaintext data and the plaintext data is delivered to the requesting object.

If a problem occurs when the anti-forgery authorization code is checked, the trust relationship between objects is untrusty, or an object requesting data extraction falls to provide trust information, information indicating absence of data in the clipboard is delivered to the object requesting data extraction.

By doing so, independent and safe data delivery between trusty objects and safe clipboard content delivery to an untrusty object become possible.

Meanwhile, the foregoing description is associated with a process of storing data in a clipboard from a substantial object, in which by preventing data of a security-demanding object from being leaked as a plaintext without permission, security reliability is improved. However, in case of screen capture which hard-copies a work screen of the terminal, some of internal information of a trusty object may be secured through the clipboard without permission. To prevent such a problem, in case of screen capture, when a security-demanding trusty object is being executed or is exposed on the screen, an operation of an expert screen capture program may be stopped. However, in case of basic screen capture using a 'Print Screen' key, a document work is frequently used, and thus, stopping the capture program may degrade work efficiency. Therefore, when image data is stored in the clipboard through screen capture, such storage is regarded as a case where the trusty object requests data storage, considering execution or screen exposure of the trusty object, such that capture data is encrypted and stored and the encrypted data is decrypted and delivered to only the trusty object, thereby allowing use of a screen capture function and preventing data of a security-demanding object from being leaked.

The present invention has been particularly shown and described with reference to exemplary embodiments thereof. However, the present invention is not limited to the foregoing embodiments and those of ordinary skill in the art may make various modifications without departing from the subject matter of the present invention as defined by the following claims.

The invention claimed is:

1. A clipboard security system, comprising:
 a clipboard managing program, executed by a central processing unit of a computer, for storing data in a clipboard or extracting data from the clipboard in response to a request from one or more objects, and
 a clipboard managing unit including:
  a data encrypting unit for encrypting the data for which storage is requested according to a trust relationship of an object to store the data in the clipboard; and
  a data decrypting unit for decrypting the encrypted data according to a trust relationship of an object to extract the encrypted data stored in the clipboard,
 wherein the one or more objects comprise a trusted object which requires security and an untrusted object which does not require security,
 wherein when the trusted object requests storage or extraction of the encrypted data with respect to the clipboard, the clipboard managing unit receives trust information indicating the trust relationship from the trusted object,
 wherein when the untrusted object requests storage or extraction of the encrypted data to or from the clipboard, the clipboard managing unit delivers the encrypted data to the untrusted object without performing a decryption operation with respect to the encrypted data, and
 wherein said clipboard managing unit is explicitly called by the clipboard managing program when a security request is executed, such that the clipboard managing unit is separately configured and operated for each security requesting application.

2. The clipboard security system of claim 1, wherein the clipboard managing unit further comprises:
 a trust information analyzing unit for receiving the trust information from the trusted object and analyzing the trust information to control at least one of the data encrypting unit and the data decrypting unit.

3. The clipboard security system of claim 1, further comprising:
 a digital rights management (DRM) unit for receiving trust information indicating the trust relationship from the clipboard managing unit and providing an encryption/decryption key to the clipboard managing unit according to a result of analyzing the trust information.

4. The clipboard security system of claim 1, wherein the clipboard security system communicates with an external DRM system, provides trust information indicating the trust relationship from the clipboard managing unit to the external DRM system, and receives a data encryption/decryption key from the external DRM system.

5. The clipboard security system of claim 1, wherein the clipboard managing unit operates in one of an application programming interface (API) scheme which operates according to execution of the object and a hooking scheme which monitors any type of object execution.

6. The clipboard security system of claim 1, wherein the clipboard managing unit further generates an anti-forgery authorization code for preventing forgery of the encrypted data and stores the generated anti-forgery authorization code to the clipboard.

7. The clipboard security system of claim 6, wherein the clipboard managing unit checks forgery of the encrypted data by using the anti-forgery authorization code prior to decryption of the encrypted data.

8. The clipboard security system of claim 6, wherein the clipboard managing unit further generates a plaintext encryption identifier indicating encryption or non-encryption of the data and encrypted information of the trust information indicating the trust relationship and stores the generated plaintext encryption identifier and encrypted trust information in the clipboard.

9. The clipboard security system of claim 1, wherein when a screen capture operation is performed, the clipboard managing unit determines whether the screen capture operation is performed during execution of the trusted object or exposure of the trusted object, encrypts a captured screen according to a result of the determination, and stores the encrypted captured screen in the clipboard.

10. The clipboard security system of claim 1, wherein the clipboard managing unit manages an access between the trusted object and the clipboard, and the clipboard security system further comprises a clipboard auxiliary managing unit for managing the access between the trusted object and the clipboard.

11. The clipboard security system of claim 10, wherein, when the data extracted from the clipboard is plaintext data, the clipboard auxiliary managing unit provides the plaintext data to the untrusted object.

12. A clipboard security system, comprising:
a clipboard for temporarily storing data;
a clipboard managing program executed by a central processing unit of a computer;
a clipboard managing unit, executed by said central processing unit of said computer, positioned between one or more objects and the clipboard to control storage of data requested from the one or more objects in the clipboard and extraction of data from the clipboard, encrypt the data in response to trust information provided from the one or more objects, store the encrypted data in the clipboard, or decrypt the encrypted data stored in the clipboard in response to the trust information provided from the one or more objects and provide the decrypted data to the one or more objects,
wherein the one or more objects comprise a trusted object which requires security and an untrusted object which does not require security,
wherein said clipboard managing unit is explicitly called by the clipboard managing program when a security request is executed such that the clipboard managing unit is separately configured and for each security request, and
wherein the clipboard security system further comprises a clipboard auxiliary managing unit for providing the encrypted data to the untrusted object without performing a decryption operation with respect to the encrypted data when storage or extraction of the encrypted data is requested from the untrusted object.

13. The clipboard security system of claim 12, wherein the clipboard managing unit encrypts the data or decrypts the encrypted data in response to the trust information provided from the trusted object when storage or extraction of the data is requested from the trusted object.

14. The clipboard security system of claim 12, wherein the clipboard managing unit receives a request for storage or extraction of the data from the trusted object, encrypts the data or decrypts the encrypted data in response to the trust information provided from the trusted object.

15. The clipboard security system of claim 12, further comprising a digital rights management (DRM) unit for storing an encryption/decryption key for encrypting/decrypting the data, receiving trust information of the trusted object from the clipboard managing unit, and providing the encryption/decryption key to the clipboard managing unit according to the received trust information.

16. A clipboard security method, executed by a computer for managing use of a clipboard by one or more objects, via a clipboard managing system including at least one clipboard management program, the at least one clipboard management program comprising at least a first clipboard managing unit and a second clipboard managing unit, the clipboard security method comprising:
receiving first information comprising data from a first object;
determining whether the first information comprises trust information corresponding to the first object by said clipboard management system;
selectively performing an encryption operation with respect to the data received according to a result of the determination by explicitly calling on the first clipboard managing unit by the clipboard management program when a security request is executed from the first object;
storing the encrypted data in the clipboard by the first clipboard managing unit;
receiving second information comprising a data extraction request from a second object;
determining whether the second information comprises trust information corresponding to the second object using the second clipboard managing unit; and
in response to determining that the second information does not comprise the trust information corresponding to the second object and the second object requests storage or extraction of the encrypted data with respect to the clipboard, providing the encrypted data to the second object by the second clipboard managing unit without performing a decryption operation with respect to the encrypted data.

17. The clipboard security method of claim 16, further comprising:
performing a decryption operation by said second clipboard managing unit with respect to the encrypted data stored in the clipboard in response to determining that the second information comprises the trust information corresponding to the second object; and
providing the decrypted data to the second object by said clipboard managing program.

18. The clipboard security method of claim 17, further comprising:
in response to determining that the second information does not comprise the trust information corresponding to the second object and the second object requests extraction of plaintext data stored in the clipboard, providing the plaintext data stored in the clipboard to the second object.

19. The clipboard security method of claim 17, further comprising:
- delivering trust information included in the received first information or second information to a digital rights management (DRM) system; and
- providing a security key stored in the DRM system to an encryption/decryption means according to a result of the determination with respect to the trust information,
- wherein the encryption/decryption of the data is performed by using the security key provided from the DRM system.

20. The clipboard security method of claim 17, wherein the performing of the encryption operation comprises generating an anti-forgery authorization code for preventing forgery of the encrypted data, and
- the performing of the decryption operation comprises determining whether the encrypted data extracted from the clipboard is identical to an original value stored in the clipboard by referring to the anti-forgery authorization code.

21. The clipboard security method of claim 17, wherein the performing of the encryption operation comprises generating a plaintext encryption identifier indicating encryption or non-encryption of the data, and
- the performing of the decryption operation comprises performing the decryption operation by referring to the plaintext encryption identifier.

22. The clipboard security method of claim 17, further comprising:
- in response to determining that data requested to be stored in the clipboard is a captured screen, determining whether the captured screen is obtained during execution of a trusted object which requires security or exposure of the trusted object,
- wherein according to a result of the determination, the captured screen is encrypted and stored in the clipboard.

* * * * *